US009055224B2

(12) United States Patent
Wakamatsu

(10) Patent No.: US 9,055,224 B2
(45) Date of Patent: Jun. 9, 2015

(54) OPTICAL APPARATUS, IMAGE CAPTURING APPARATUS, AND METHOD FOR CONTROLLING OPTICAL APPARATUS

(71) Applicant: CANON KABUSHIKI KAISHA, Tokyo (JP)

(72) Inventor: Nobushige Wakamatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/453,191

(22) Filed: Aug. 6, 2014

(65) Prior Publication Data
US 2014/0347506 A1 Nov. 27, 2014

Related U.S. Application Data

(62) Division of application No. 13/271,893, filed on Oct. 12, 2011, now Pat. No. 8,830,336.

(30) Foreign Application Priority Data

Oct. 19, 2010 (JP) .................................. 2010-234207

(51) Int. Cl.
H04N 5/228 (2006.01)
H04N 5/232 (2006.01)
G02B 27/64 (2006.01)

(52) U.S. Cl.
CPC .......... H04N 5/23267 (2013.01); G02B 27/646 (2013.01); G03B 2217/005 (2013.01); H04N 5/23258 (2013.01)

(58) Field of Classification Search
CPC .................. H04N 5/23258; H04N 5/23287
USPC ............................. 348/208.2–208.7
See application file for complete search history.

(56) References Cited

U.S. PATENT DOCUMENTS

2008/0136924 A1* 6/2008 Washisu ................. 348/208.2

* cited by examiner

Primary Examiner — Christopher K Peterson
(74) Attorney, Agent, or Firm — Cowan, Liebowitz & Latman, P.C.

(57) ABSTRACT

An image capturing apparatus detects the angular rotational shake and translational shake generated in the apparatus using an angular velocity sensor and an accelerometer. An angular rotational shake correction coefficient calculation unit calculates a first correction coefficient using a zoom lens position and a focus lens position. A translational shake correction coefficient calculation unit calculates a second correction coefficient using the imaging magnification of an imaging optical system. The camera CPU 106 computes a correction amount for angular rotational shake from the detected value of angular rotational shake and the first correction coefficient, computes a correction amount for translational shake from the detected value of translational shake and the second correction coefficient, produces both of the correction amounts to thereby calculate an image shake correction amount so as to suppress an increase in an image magnification for controlling image stabilization in a direction of increasing an imaging magnification. A driving unit drives a shake correction unit in accordance with an image shake correction amount, and a shake correction unit corrects image shake generated in the image surface of an imaging optical system.

4 Claims, 12 Drawing Sheets

OPTICAL APPARATUS, IMAGE CAPTURING APPARATUS, AND METHOD FOR CONTROLLING OPTICAL APPARATUS

CROSS-REFERENCE TO RELATED APPLICATIONS

This application is a divisional of application Ser. No. 13/271,893, filed Oct. 12, 2011, the entire disclosure of which is hereby incorporated by reference.

BACKGROUND OF THE INVENTION

1. Field of the Invention

The present invention relates to an image stabilization control technology that corrects or prevents image shake or image degradation occurring due to shaking such as hand shake.

2. Description of the Related Art

In recent years, all operations of a camera significant to image capture, such as the operation for determining the exposure and a focusing operation, may be performed automatically. Accordingly, even a user who is not accustomed to using a camera may nearly always succeed in taking high quality pictures. For example, there is a function for performing continuous focusing in auto-focus (AF) processing using image processing technology during moving image photographing or while an EVF image is continuously taken so as to cause a display device associated with an image capturing apparatus to function as an electronic view finder (EVF). This is known as a "continuous AF function". In order to prevent image shake due to hand shake or the like, a camera including an image stabilization control apparatus consisting of a shake correction unit, a driving unit, a shake detection unit, and the like eliminates almost all of the factors that induce a shooting mistake by a photographer.

Here, an image stabilization control apparatus will be briefly described. The hand shake that may occur with a camera during image capture is a shake with a frequency of generally 1 to 10 Hz. To take a photograph without any image shake even when such hand shake is applied to a camera when the shutter is released, it is necessary to detect the angular rotational shake applied to the camera due to hand shake and displace a lens for correcting image shake (hereinafter simply referred to as a "correction lens") according to the detected value.

Meanwhile, when an image is taken at a short distance (under a capture condition in which a high imaging magnification is used), image degradation caused by translational shake, which may not be detected by an angular velocity sensor alone and is applied to the horizontal direction or the vertical direction lying in a plane perpendicular to the optical axis of the camera, may not be ignored. For example, when a subject image is taken at such a close subject distance of about 20 cm in the case of macro photography, it becomes necessary to actively detect and correct the translational shake. Under capture conditions in which the focal length of an imaging optical system is very large (e.g., 400 mm) even when a subject distance of 1 meter is ensured, it also becomes necessary to detect and correct the translational shake.

Japanese Patent Laid-Open No. 7-225405 discloses a technology in which an accelerometer configured to detect acceleration is provided to determine translational shake by taking the second integral of the detected acceleration and drive a shake correction unit according to the detected translational shake value and an output from an angular velocity meter, which is provided separately. Japanese Patent Laid-Open No. 2010-25962 discloses a technology in which translational shake is determined by taking angular rotational shake when the rotation center is located far from the camera.

However, in the correction of translational shake using the image stabilization control, the shake amount to be corrected on an imaging surface due to translational shake becomes greatly different due to the difference between photographing a subject at a short distance and photographing a subject at a long distance (i.e., difference in imaging magnification). In this case, a shake correction amount for correcting image shake occurring due to translational shake is calculated using the imaging magnification of an image-taking lens, which has been obtained by positional information about a zoom lens and a focus lens.

Even if the translational shake amount of the camera is the same, the imaging magnification may change from time to time during an AF operation. Thus, a translational shake correction amount to be corrected on the imaging surface also changes depending on the imaging magnification. If the image stabilization control is performed in accordance with information about the imaging magnification obtained from the zooming or focusing state while the camera is searching for a peak of the AF evaluation value by a contrast AF operation, image stabilization performance may be degraded.

More specifically, when a focus lens is driven in a direction of increasing an imaging magnification (the movement in the close-up side), a translational shake correction amount becomes excessive, resulting in an adverse effect on shake correction. Furthermore, a correction lens immediately reaches the control terminal thereof due to excessive control, resulting in a degradation of the image stabilization control performance.

The present invention provides an apparatus that performs the image shake correction of translational shake with high accuracy while reducing the degradation of the image stabilization control performance in association with a sudden change in image magnification during imaging, and a method for controlling the same.

SUMMARY OF THE INVENTION

In view of the foregoing, according to an aspect of the present invention, an optical apparatus having an imaging optical system including at least a focus lens, the optical apparatus comprise: a first detection unit configured to detect angular rotational shake; a second detection unit configured to detect translational shake in such a way that is distinct from the first detection unit; a control unit configured to compute an image shake correction amount by producing a correction amount for the angular rotational shake and a correction amount for the translational shake based on the output of the first detection unit and the output of the second detection unit; and a driving unit configured to drive a shake correction unit in accordance with the image shake correction amount. The control unit computes an image magnification for controlling image stabilization using positional information about a zoom lens and a focus lens of the optical system, and calculates the image shake correction amount so as to suppress an increase in the image magnification for controlling image stabilization in a direction of increasing the image magnification of the optical system.

According to the present invention, the image shake correction of translational shake may be performed with high accuracy while reducing the degradation of the image stabilization control performance in association with a sudden change in image magnification during imaging.

Further features of the present invention will become apparent from the following description of exemplary embodiments with reference to the attached drawings.

DESCRIPTION OF THE EMBODIMENTS

Hereinafter, embodiments of the present invention will be described with reference to the attached drawings.

First Embodiment

Figure 1:
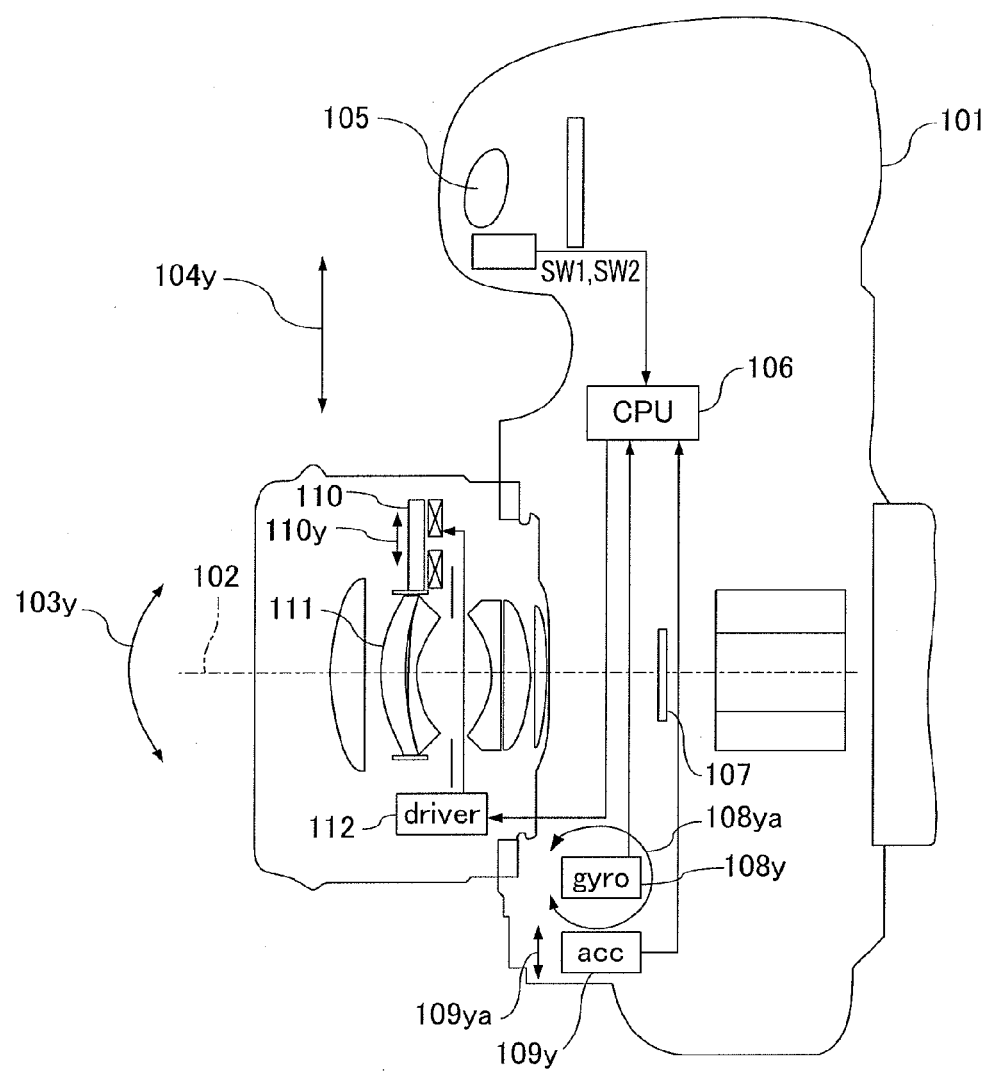
FIG. 1 is a schematic view of a camera mounted with an image stabilization system as viewed from above in order to explain a first embodiment of the present invention in conjunction with FIGS. 2 to 10.
Figure 2:
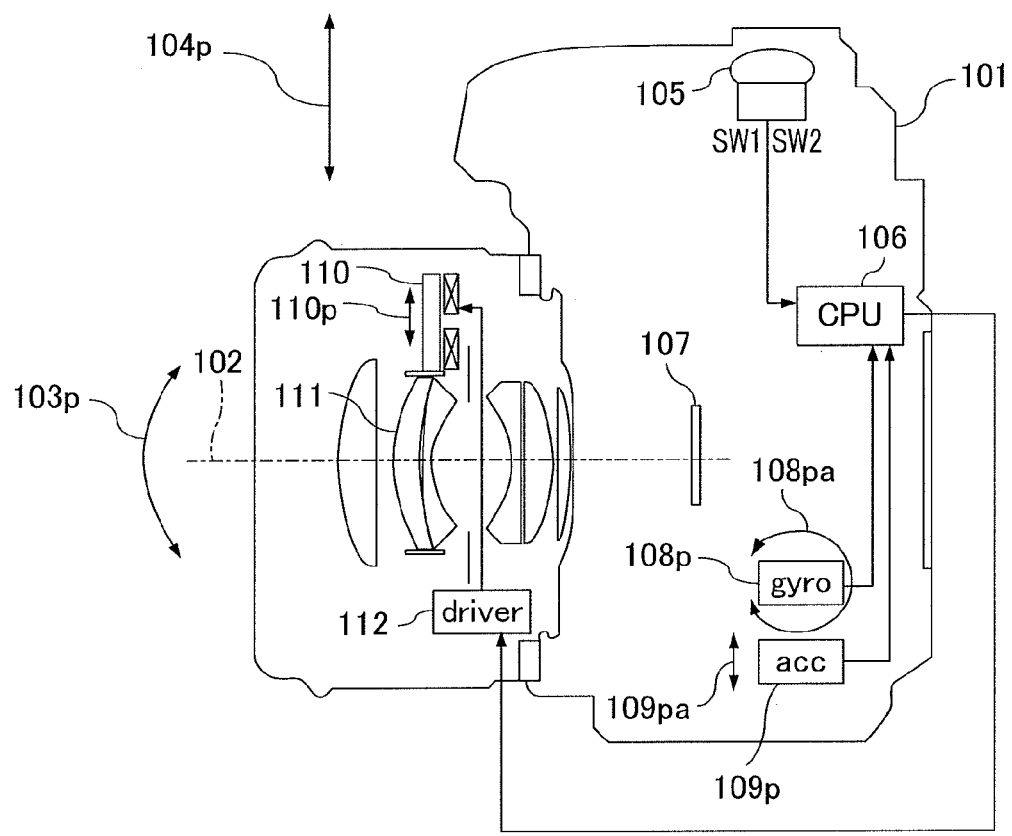
FIG. 2 is a schematic view of the camera shown in FIG. 1 as viewed from the side thereof.

Each of FIG. 1 and FIG. 2 shows an exemplary configuration of a camera serving as an optical apparatus that includes an image stabilization control apparatus according to a first embodiment. FIG. 1 is a schematic view of a camera as viewed from above. FIG. 2 is a schematic view of a camera as viewed from the side thereof. The axis shown by a dot-dash line in FIG. 1 and FIG. 2 represents an optical axis 102 of an imaging optical system of a camera 101. In an image stabilization system mounted on the camera 101, image shake correction is performed based on the shake (hereinafter referred to as "angular rotational shake") shown by the arrows 103p and 103y and the shake (hereinafter referred to as "translational shake") shown by the arrows 104p and 104y with respect to the optical axis 102. Reference symbol "β" is appended to a reference number indicating the pitch direction and reference symbol "y" is appended to a reference number indicating the yaw direction. The pitch direction and the yaw direction are mutually orthogonal to each other, and both directions are orthogonal to the optical axis.

A release button 105 is mounted on the camera body 101, and a switch opening/closing signal input by operation of the button is transmitted to a camera CPU (Central Processing Unit) 106. In the present embodiment, a two-step switch is provided in which a first switch (hereinafter referred to as "SW1") is switched to the ON state when the release button 105 is half-pressed and a second switch (hereinafter referred to as "SW2") is switched to the ON state when the release button 105 is fully pressed. The camera CPU 106 controls a camera operation, and is responsible for controlling image shake correction. An imaging element 107 converts a subject image, which has been obtained through the lens of an imaging optical system, into an electrical signal to be output to a signal processing unit (not shown).

A shake detection unit that detects shaking of a camera is constituted by angular velocity detection units and acceleration detection units.

The angular velocity sensors 108p and 108y are angular velocity detection units configured to detect angular rotational shake around the arrows 108pa and 108ya, respectively. Also, the accelerometers 109p and 109y are acceleration detection units configured to detect translational shake shown by the arrows 109pa and 109ya, respectively. The signals detected by the angular velocity sensors 108p and 108y and the accelerometers 109p and 109y are input to the camera CPU 106.

A shake correction unit 110 drives a correction lens 111 in a direction perpendicular to the optical axis, more specifically, in a direction shown by the arrow 110y in FIG. 1 and in a direction shown by the arrow 110p in FIG. 2, and performs shake correction taking into account both angular rotational shake and translational shake. A driving unit 112 drives the shake correction unit 110 in accordance with a control command given by the camera CPU 106. With this arrangement, a shake correction operation is performed. In the present embodiment, optical image stabilization system is employed for moving the correction lens 111 in a plane normal to the optical axis based on the correction amount calculated by the camera CPU 106. A correction method based on the correction amount is not limited to optical image stabilization, but another method may also be employed. For example, an image stabilization method for preventing a shake by moving the imaging element 107 in a plane normal to the optical axis, or an electronic image stabilization method for reducing the influence of shake by changing the cut-out position of each imaging frame output by an imaging element may be employed. A correction method for combining these methods as appropriate may also be employed.

Figure 3:
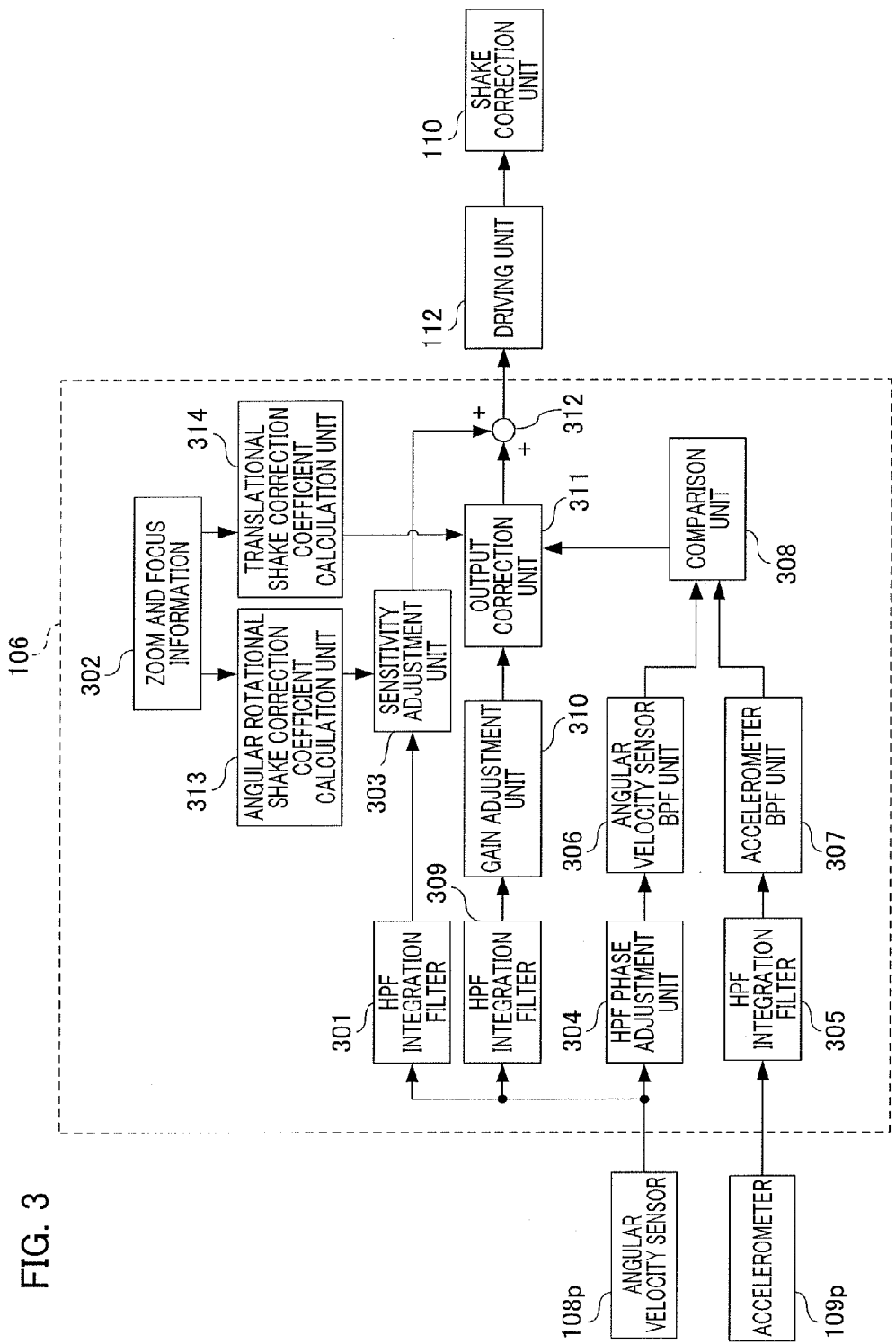
FIG. 3 is a block diagram illustrating an exemplary configuration of an image stabilization control apparatus.

FIG. 3 is a block diagram illustrating an exemplary configuration of an image stabilization control apparatus according to the present embodiment. FIG. 3 only shows the configuration of the shake (pitch direction: directions shown by the arrows 103y and 104y in FIG. 2) generated in the vertical direction of the camera 101. However, the same configuration is also provided for the shake (yaw direction: directions shown by the arrows 103p and 104p in FIG. 1) generated in the horizontal direction of the camera. Since they basically have the same configuration, only the configuration in the pitch direction will be described below. FIG. 3 shows a functional block diagram of processing performed by the camera CPU 106. The camera CPU 106 interprets and executes a program stored in a memory (not shown) to thereby perform each processing.

A description will be given of angular rotational shake correction with reference to FIG. 3. Angular rotational shake is detected by the first detection unit to thereby perform shake correction under the control of the camera CPU 106.

An angular velocity signal from the angular velocity sensor 108$p$ is input to an HPF integration filter 301 of the camera CPU 106. A signal, of which the DC (direct current) component has been cut out by an HPF (high pass filter), is integrated by the HPF integration filter 301 to thereby be converted into an angle signal. The frequency band of hand shake falls within the range of about 1 to 10 Hz. The HPF of the HPF integration filter 301 has primary HPF characteristics that block a frequency component (e.g., 0.1 Hz or lower) sufficiently far from the frequency band of hand shake.

The output of the HPF integration filter 301 is input to a sensitivity adjustment unit 303. At this time, information obtained from an angular rotational shake correction coefficient calculation unit 313 is also input to the sensitivity adjustment unit 303. The angular rotational shake correction coefficient calculation unit 313 receives zoom and focus information (positional information) 302, and calculates a first correction coefficient (hereinafter referred to as "angular rotational shake correction coefficient") based on the focal distance and the imaging magnification determined by the information to thereby output the first correction coefficient to the sensitivity adjustment unit 303. A method for calculating an angular rotational shake correction coefficient will be described in detail below. When the output of the angular rotational shake correction coefficient calculation unit 313 is input to the sensitivity adjustment unit 303, the sensitivity adjustment unit 303 amplifies the output of the HPF integration filter 301 so as to obtain an angular rotational shake correction target value. With this arrangement, a change in the shake correction sensitivity on an image plane of the camera to a shake correction stroke of the shake correction unit 110, which has been caused by the change in optical information such as focusing or zooming of a lens position, is corrected. The sensitivity adjustment unit 303 sends the determined angular rotational shake correction target value to an adder 312. The output of the adder 312 is sent as an image shake correction amount to the driving unit 112. The driving unit 112 drives the shake correction unit 110 to thereby perform image shake correction.

Next, a description will be given of translational shake correction. Translational shake generated in an apparatus in a horizontal direction or a vertical direction in the plane perpendicular to the optical axis of the imaging optical system is detected by a second detection unit, and thus, shake correction is performed under the control of the camera CPU 106.

The output of the angular velocity sensor 108$p$ is input to an HPF integration filter 309. Then, the HPF of the HPF integration filter 309 filters out DC components from the output. Furthermore, the output is integrated to be converted into an angle signal. The output of the HPF integration filter 309 is input to a gain adjustment unit 310. The gain adjustment unit 310 and the HPF integration filter 309 adjust the gain and phase characteristics in a frequency band to be subject to translational shake correction. The output of the gain adjustment unit 310 is corrected by an output correction unit 311 to be described below to obtain a translational shake correction target value. The translational shake correction target value is sent to the adder 312 to be added to the angular rotational shake correction target value described above. The addition result obtained by adding a translational shake correction amount and an angular rotational shake correction amount becomes an image shake correction amount.

Also, the output of the angular velocity sensor 108$p$, in parallel with the above-described processing, is input to an HPF phase adjustment unit 304. The HPF phase adjustment unit 304 filters out DC components that overlap the output of the angular velocity sensor 108$p$, and adjusts the phase of the signal. Here, the cutoff frequency is adjusted to match the cutoff frequency of the HPF of an HPF integration filter 305 to be described below such that the frequency characteristics are matched to each other. The output of the HPF phase adjustment unit 304 is sent to an angular velocity sensor BPF (band pass filter) unit 306 serving as a band pass unit to thereby extract a frequency component in a predetermined band.

The output of the accelerometer 109$p$ is input to the HPF integration filter 305. Then, the HPF of the HPF integration filter 305 filters out DC components from the output. Then, the output is integrated to be converted into a velocity signal. As described above, the cutoff frequency of the HPF of the HPF integration filter 305 is set so as to be matched with the frequency characteristics of the HPF of the HPF phase adjustment unit 304. The output of the HPF integration filter 305 is sent to an accelerometer BPF unit 307 serving as a band pass unit to thereby extract a frequency component in a predetermined band.

The outputs of an angular velocity sensor BPF unit 306 and the accelerometer BPF unit 307 are input to the comparison unit 308. The comparison unit 308 calculates a correction amount (correction coefficient) for correcting the output of the gain adjustment unit 310, and outputs the calculated correction amount to the output correction unit 311. A method for calculating a correction amount by the comparison unit 308 will be described below.

The output of a translational shake correction coefficient calculation unit 314 is also input to the output correction unit 311. The angular rotational shake correction coefficient calculation unit 314 receives zoom and focus information 302, and calculates a second correction coefficient (hereinafter referred to as "translational shake correction coefficient") based on the imaging magnification determined by these positional information. A method for calculating a translational shake correction coefficient will be described in detail below. The output of the translational shake correction coefficient calculation unit 314 is input to the output correction unit 311. The output correction unit 311 corrects the output of the gain adjustment unit 310 based on the calculated translational shake correction coefficient to thereby obtain a translational shake correction target value. The adder 312 adds the translational shake correction target value to the aforementioned angular rotational shake correction target value, and then outputs the results as an image shake correction amount to the driving unit 112. In this manner, the shake correction unit 110 is driven by the driving unit 112, and thus, image shake is corrected for both angular rotational shake and translational shake.

Next, a description will be given of a method for calculating an image shake correction amount based on a correction amount output from the comparison unit 308, and correction coefficients output from the angular rotational shake correction coefficient calculation unit 313 and the translational shake correction coefficient calculation unit 314.

Figure 4:
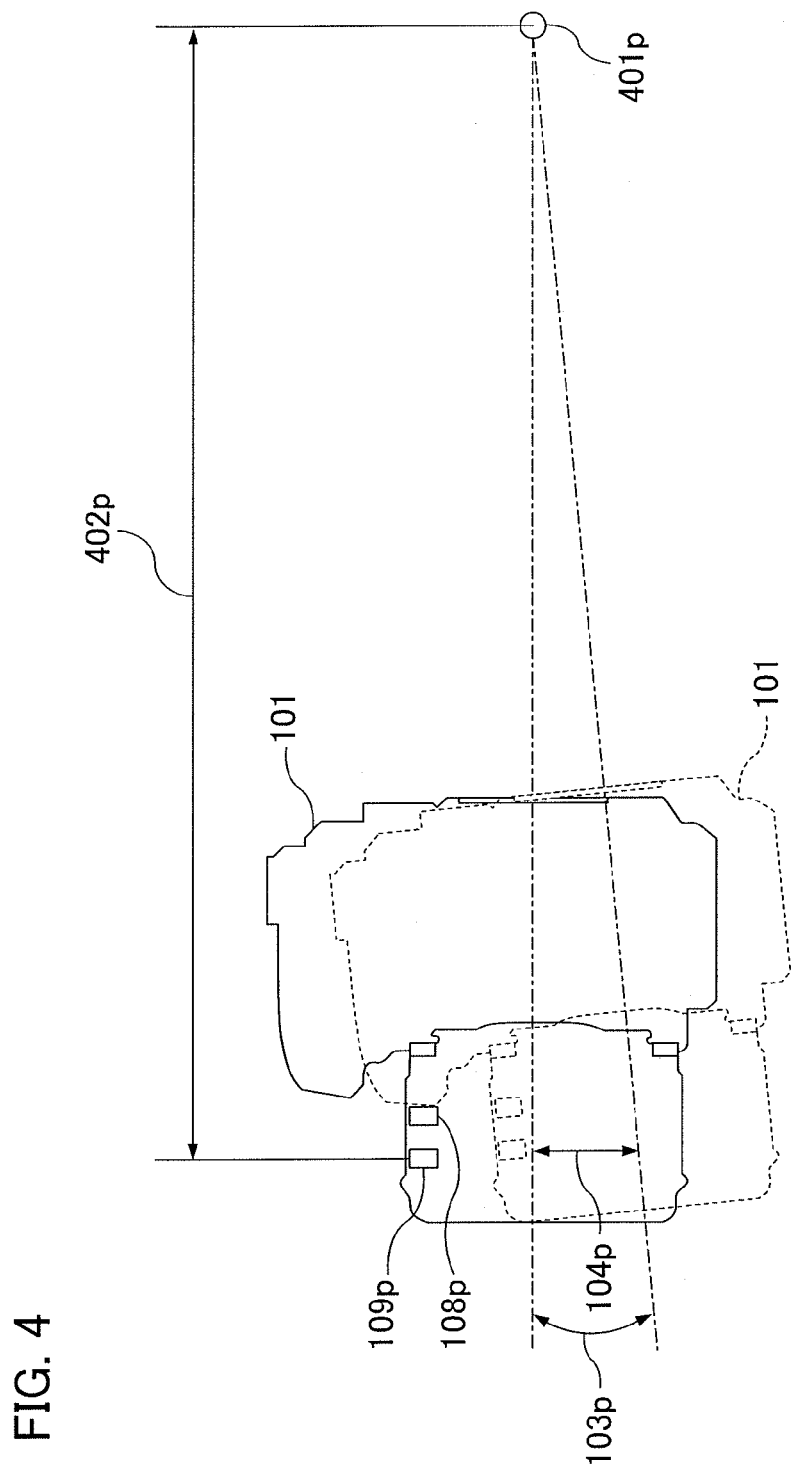
FIG. 4 is an illustrative diagram of the rotation center and the rotation radius of angular rotational shake.

FIG. 4 shows angular rotational shake 103$p$ and translational shake 104$p$ of the camera 101. In a principle point location of the imaging lens, i.e., the imaging optical system of the camera 101, the magnitude of the translational shake

104p is represented by "Y", and the magnitude of the angular rotational shake 103p, i.e., angular displacement, is represented by "θ". When the rotation center 401p of the angular rotational shake is defined, the length of a rotation radius 402p is represented by "L". The length "L" corresponds to the distance between the rotation center 401p and the accelerometer 109p. Also, the angular velocity is represented by "ω", the velocity is represented by "V", the acceleration is represented by "A", and the angle acceleration is represented by "ωa". At this time, the following relationship is satisfied.

[Formula 1]

$$Y = L \times \theta \quad (1)$$

$$V = L \times \omega \quad (2)$$

$$A = L \times \omega a \quad (3)$$

Here, a displacement "Y" in Formula (1) is calculated by second-order integration of the output of the accelerometer 109p, and an angular displacement "θ" is calculated by first-order integration of the output of the angular velocity sensor 108p. Thus, when "Y" is divided by "θ", the length "L" of the rotation radius is calculated. Also, a velocity "V" in Formula (2) is calculated by first-order integration of the output of the accelerometer 109p, and an angular velocity "ω" is calculated by the output of the angular velocity sensor 108p. Thus, when "V" is divided by "ω", the length "L" of the rotation radius is calculated. Acceleration "A" in Formula (3) is calculated by the output of the accelerometer 109p, and an angle acceleration "ωa" is calculated by first-order differentiation of the output of the angular velocity sensor 108p. Thus, when "A" is divided by "ωa", the length "L" of the rotation radius is calculated. Any of Formula (1) to (3) can be used to calculate the value L.

Using the translational shake "Y" at the principle point location of the imaging optical system, the shake angle "θ", the focal length "f", and the imaging magnification "β" of the imaging optical system, the shake amount "δ", which may occur on the imaging surface, can be calculated by the following Formula (4).

[Formula 2]

$$\delta = (1+\beta) \times f \times \theta + \beta \times Y \quad (4)$$

The values of "f" and "β" of the first term of the right side of Formula (4) can be calculated based on positional information for the zoom lens and the focus lens of the imaging optical system, the imaging magnification and the focal length obtained thereby. The shake angle "θ" can be calculated by first-order integration of the output of the angular velocity sensor 108p. Accordingly, the angular rotational shake can be corrected depending on information as described with reference to FIG. 3.

For the second term of the right side of Formula (4), the symbol "β" can be calculated based on positional information regarding the zoom lens and the focus lens, and the imaging magnification obtained thereby, and the value of "Y" can be calculated by second-order integration of the output of the accelerometer 109p. Accordingly, the translational shake can be corrected depending on this information as described with reference to FIG. 3.

However, in the present embodiment, image shake correction is executed with respect to the shake amount "δ", which can be acquired by the following Formula (5), which is a modification of Formula (4):

[Formula 3]

$$\delta = (1+\beta) \times f \times \theta + \beta \times L \times \theta \quad (5)$$

In other words, with respect to the translational shake "Y", the present embodiment does not use the displacement of translational shake, which can be calculated based on the integration of the output of the accelerometer 109p. The length "L" of the rotation radius is calculated using Formula (1), Formula (2), or Formula (3), and the shake amount "δ" is calculated based on the value L, the integration result (θ) of the output of the angular velocity sensor 108p, and the imaging magnification "β". The angular rotational shake correction coefficient calculation unit 313 calculates a correction coefficient "(1+β)×f" that is the first term of the right side of Formula (5), and the translational shake correction coefficient calculation unit 314 calculates a correction coefficient "β" that is the second term of the right side of Formula (5).

Figure 5:
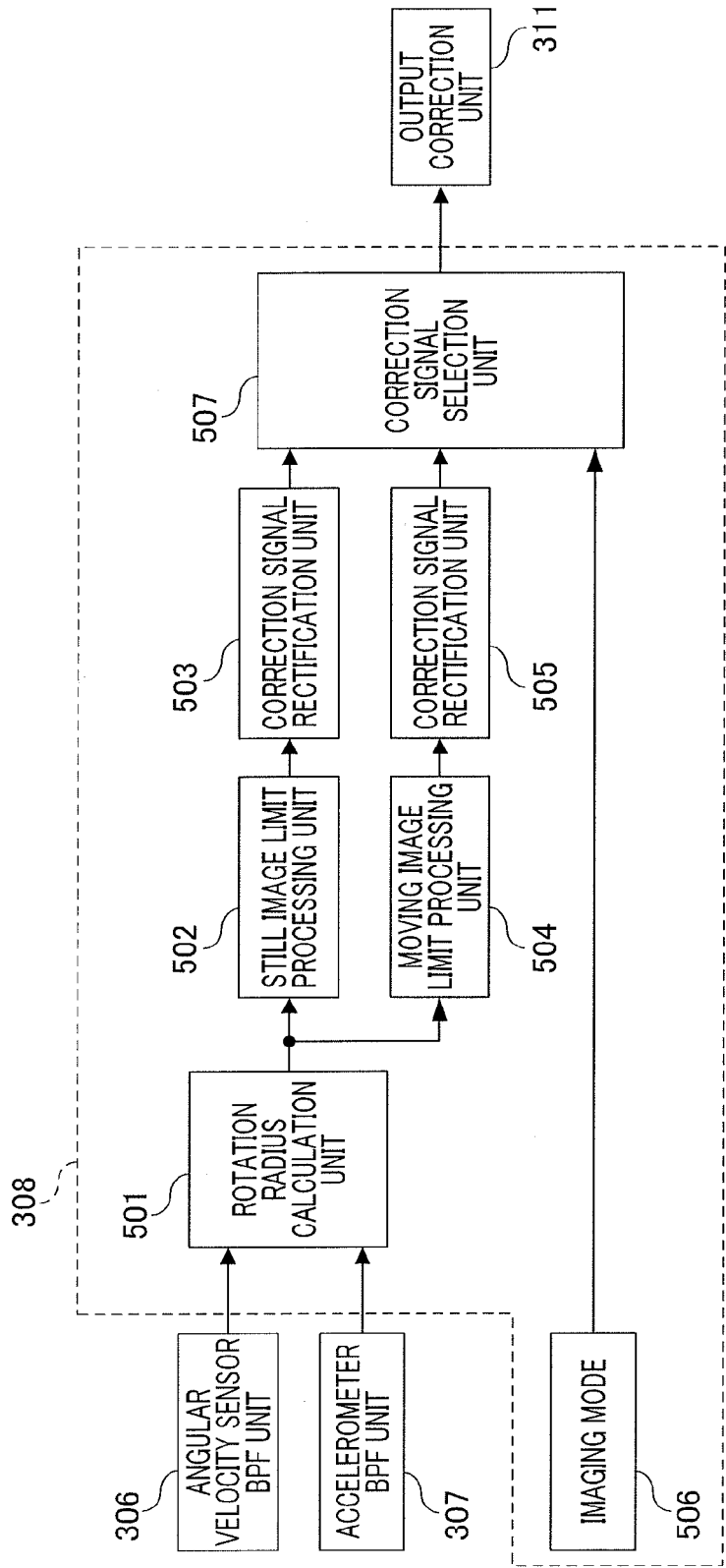
FIG. 5 is a block diagram illustrating an exemplary configuration of a comparison unit 308 shown in FIG. 3.

FIG. 5 is a block diagram illustrating an exemplary internal configuration of the comparison unit 308 shown in FIG. 3 for use in correction amount calculation processing.

The outputs of the angular velocity sensor BPF unit 306 and the accelerometer BPF unit 307 are sent to a rotation radius calculation unit 501, and the rotation radius calculation unit 501 calculates the length "L" of the rotation radius using the following Formula (6). [Formula 4]

$$L = V/\omega \quad (6)$$

In the present embodiment, the value L is calculated using Formula (2).

The rotation radius "L" may be calculated by the ratio of a maximum amplitude peak value of the velocity "V" to that of the angular velocity "ω" within a predetermined time (e.g., the time set to 200 ms when the cutoff frequency for both of the angular velocity sensor BPF unit 306 and the accelerometer BPF unit 307 is 5 Hz). Furthermore, the rotation radius "L" may be updated for each moment at which the velocity "V" and the angular velocity "ω" have been calculated. At this time, each of the velocity "V" and the angular velocity "ω" is averaged in time-sequentially, and a high-frequency component is filtered out by a low pass filter (LPF). Thus, when the rotation radius is calculated, the rotation radius having the high-frequency noise component thereof removed may be calculated.

The rotation radius calculation unit 501 sends the calculated value L to a still image limit processing unit 502 and a moving image limit processing unit 504. The still image limit processing unit 502 performs computation processing using an upper limit value set for taking still images. When the value L output by the rotation radius calculation unit 501 is equal to or greater than an upper limit value for taking still images, the value L is fixed to the upper limit value. When the value L output by the rotation radius calculation unit 501 is less than an upper limit value for taking still images, the value L output by the rotation radius calculation unit 501 is output as it is.

The moving image limit processing unit 504 performs computation processing using an upper limit value set for a moving image shooting operation. When the value L output by the rotation radius calculation unit 501 is equal to or greater than an upper limit value for shooting moving images, the value L is fixed to the upper limit value. When the value L output by the rotation radius calculation unit 501 is less than an upper limit value for shooting moving images, the value L output by the rotation radius calculation unit 501 is output as it is. The output values of the still image limit processing unit 502 and the moving image limit processing unit 504 are sent to a correction signal rectification unit 503 and a correction signal rectification unit 505, respectively.

The correction signal rectification unit 503 and the correction signal rectification unit 505 perform rectification processing for the output values of the still image limit processing unit 502 and the moving image limit processing unit 504, respectively, such that a stepwise change does not occur in a correction signal. Here, a high-frequency component is filtered out by a LPF (low pass filter) for signal rectification. The cutoff frequency of the LPF is set, for example, to a frequency of 0.5 Hz or lower. Alternately, signal rectification may be performed by a moving average computation for a predetermined period of time.

The outputs of the correction signal rectification unit 503 and the correction signal rectification unit 505 are sent to a correction signal selection unit 507. The outputs of the correction signal rectification unit 503 and the correction signal rectification unit 505 as well as a signal indicative of an imaging mode 506 are input to the correction signal selection unit 507. Correction signal selection processing is performed in accordance with the flowchart shown in FIG. 7 to be described below, and the correction signal selection unit 507 outputs the selected correction signal to the output correction unit 311.

Next, a description will be given of a minute driving operation and a hill-climbing driving operation during an AF operation with reference to FIG. 9A, FIG. 9B, FIG. 10A, FIG. 10B, and FIG. 10C.

Figure 9A:
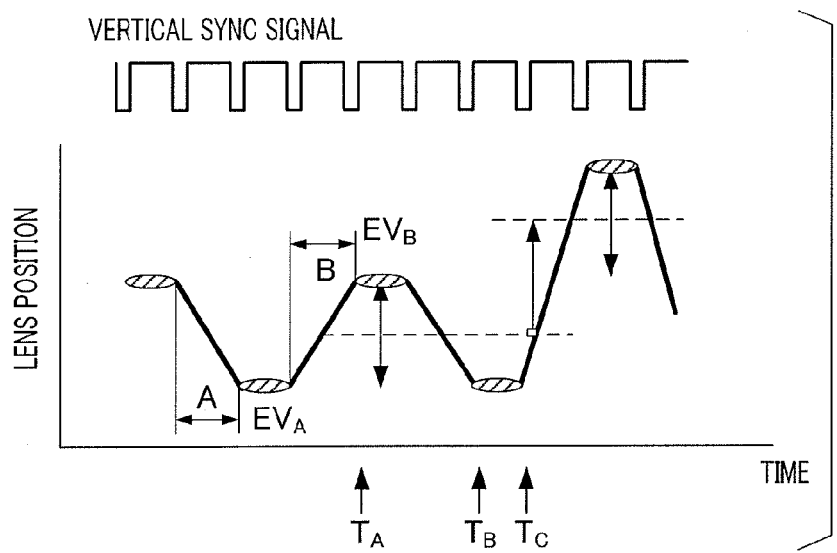
FIG. 9A is a diagram illustrating the relationship between the movement of a focus lens and the changes in an AF evaluation value during a minute driving operation of the AF operation.
Figure 9B:
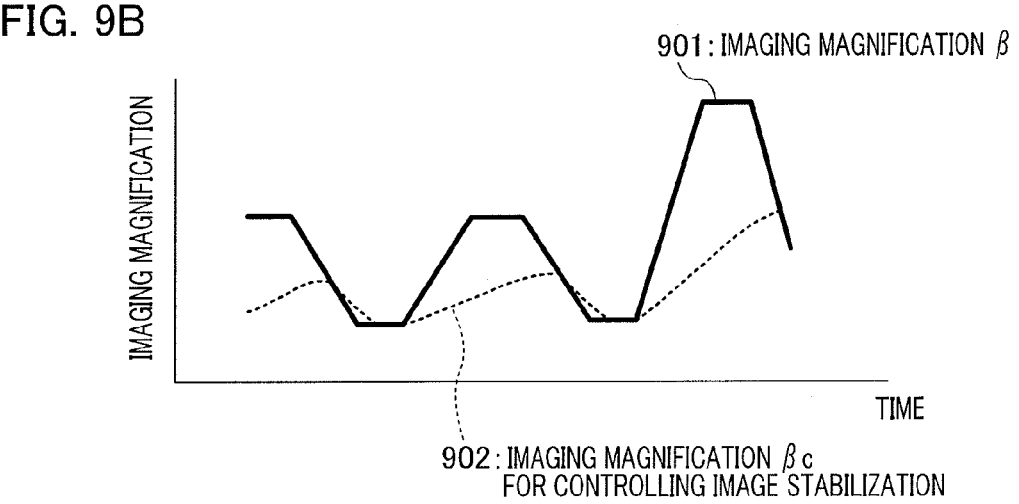
FIG. 9B is a diagram illustrating the changes in an imaging magnification "β" and an imaging magnification "βc" for controlling image stabilization for use in the present embodiment during a minute driving operation.

Firstly, a minute driving operation will be described with reference to FIG. 9A and FIG. 9B. FIG. 9A is a diagram illustrating the relationship between the movement of a focus lens and the changes in an AF evaluation value during a minute driving operation. Time is plotted on the horizontal axis, and the position of a focus lens is plotted on the vertical axis. A rectangular signal shown in the upper portion of FIG. 9A represents a horizontal sync signal of a video signal. On the other hand, FIG. 9B is a diagram illustrating the changes in an imaging magnification "β" and an imaging magnification "βc" for controlling image stabilization for use in the present embodiment during a minute driving operation, and the details thereof will be described below, where time is plotted on the horizontal axis and the imaging magnification "β" is plotted on the vertical axis.

Reference symbol "$EV_A$" in FIG. 9A represents an AF evaluation value corresponding to an electric charge that has been accumulated in the imaging element 107 for a period of time "A", and is acquired by the camera CPU 106 at a time $T_A$. Also, reference symbol "$EV_B$" represents an AF evaluation value corresponding to an electric charge that has been accumulated in the imaging element 107 for the next period of time "B", and is acquired by the camera CPU 106 at a time $T_B$. At a time $T_C$, the camera CPU 106 compares the AF evaluation value $EV_A$ with $EV_B$. If $EV_B > EV_A$, the camera CPU 106 controls to move the drive (shake) center of the minute driving of the focus lens.

More specifically, a drive amplitude is the sum of a shake amplitude and a center movement amplitude, and the drive center of a focus lens is shifted by adding the center movement amplitude of the focus lens. On the other hand, if $EV_A > EV_B$, the camera CPU 106 carries out control so as not to move the shake center of a focus lens (drive amplitude=shake amplitude). As described above, an operation for detecting the direction of increasing an AF evaluation value while moving a focus lens or an operation for searching for the focus lens position where an AF evaluation value becomes the largest (peak position) is referred to as a "minute driving operation".

As described with reference to Formulae (4) and (5), a control amount is calculated using the zoom and focus positional information of an imaging optical system and the imaging magnification "β" and the focal distance "f" obtained thereby, when image stabilization control is performed. As the position of a focus lens shown in FIG. 9A moves, the imaging magnification "β" changes as shown by a graph curve 901 shown in FIG. 9B. Note that lens driving is performed by a minute driving operation as described above, and a focus lens is not necessarily focused on the target subject.

When the value of the imaging magnification "β" increases during image stabilization control, the image stabilization control amount also increases. Here, if the imaging magnification "β" is not set properly to the target subject, image stabilization control is insufficient when the imaging magnification "β" is less than the target imaging magnification (at the position at which the subject is in focus). In contrast, if the imaging magnification "β" is greater than the target imaging magnification, image stabilization control is over-corrected. The value of an angular rotational shake correction amount and the value of a translational shake correction amount increase with an increase in the imaging magnification "β". Thus, image stabilization control is greatly affected when the error calculation is performed in a direction of increasing the imaging magnification "β". In this case, there is a possibility that deterioration in the image stabilization performance during moving image photographing or degradation in the appearance of the subject in the view finder while preparing to paragraph prior to shooting will occur during image stabilization control.

Figure 6:
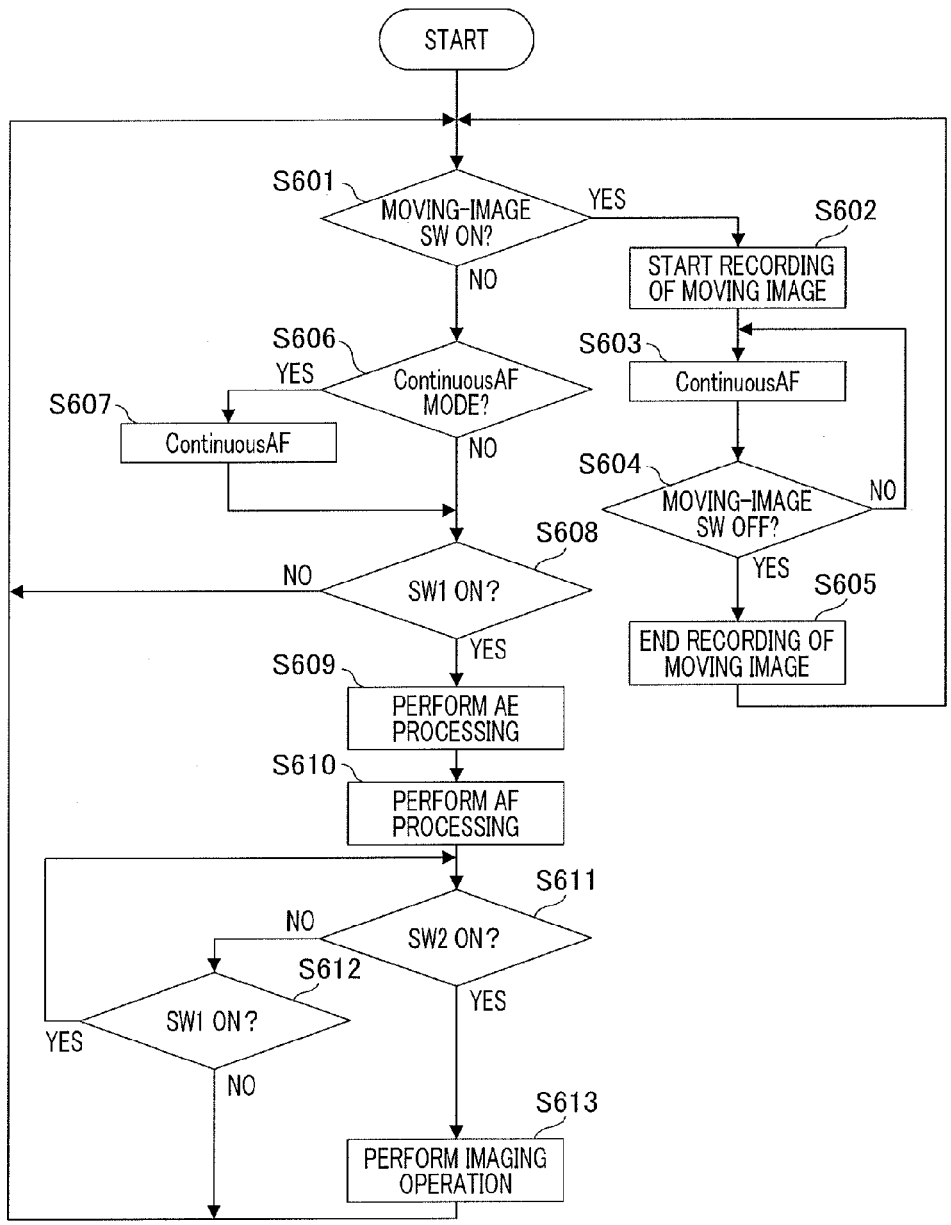
FIG. 6 is a flowchart illustrating a camera operation.
Figure 7:
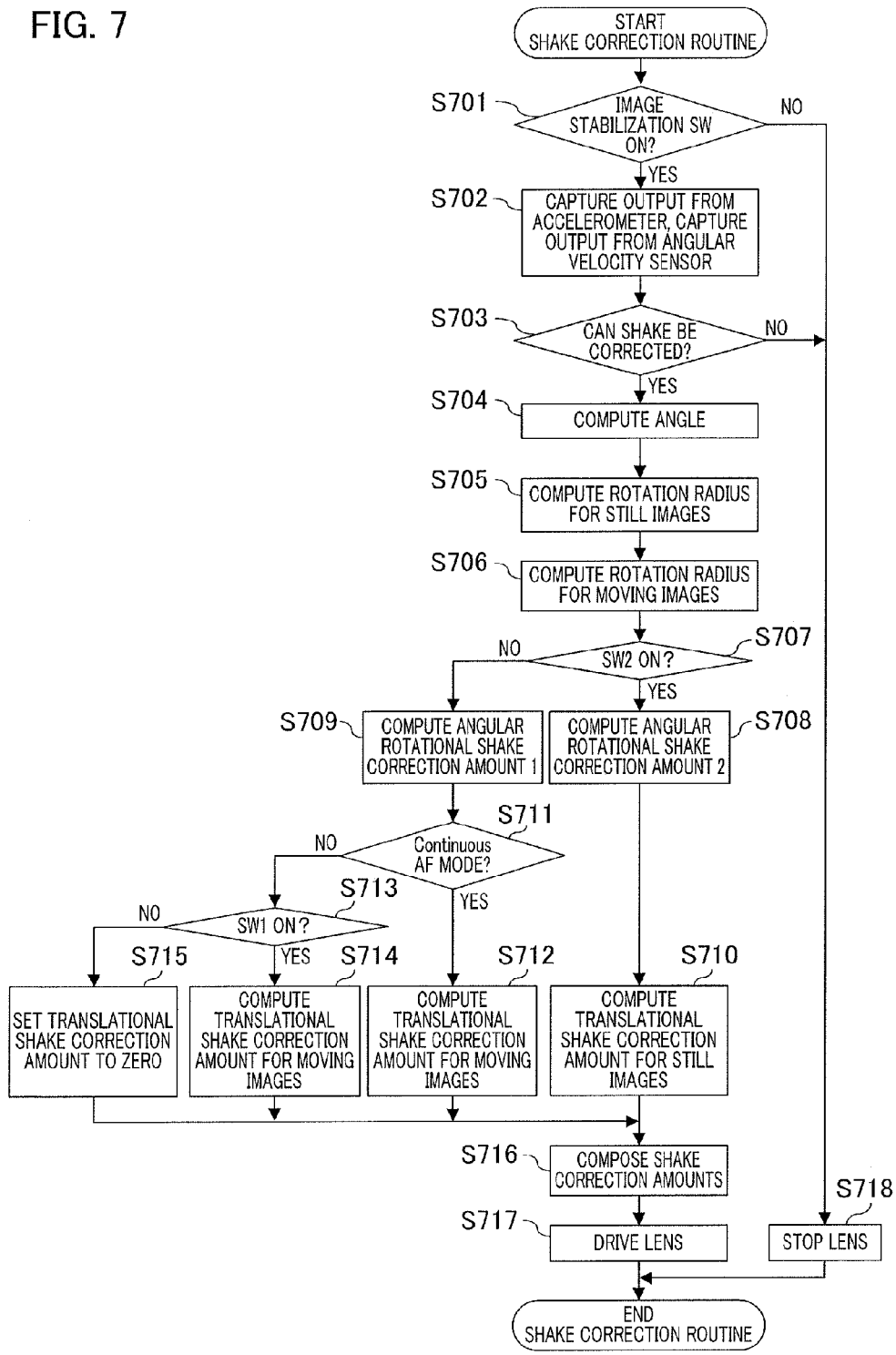
FIG. 7 is a flowchart illustrating shake correction processing according to the image stabilization control.

In view of the above, instead of using the imaging magnification "β" (see the graph curve 901 indicated by the solid line) corresponding to the focus lens position as it is for controlling image stabilization, an imaging magnification "βc" for controlling image stabilization (see a graph curve 902 indicated by the dotted line) is calculated by the method to be described below with reference to FIGS. 6 to 8 for use in the image stabilization control.

Figure 10A:
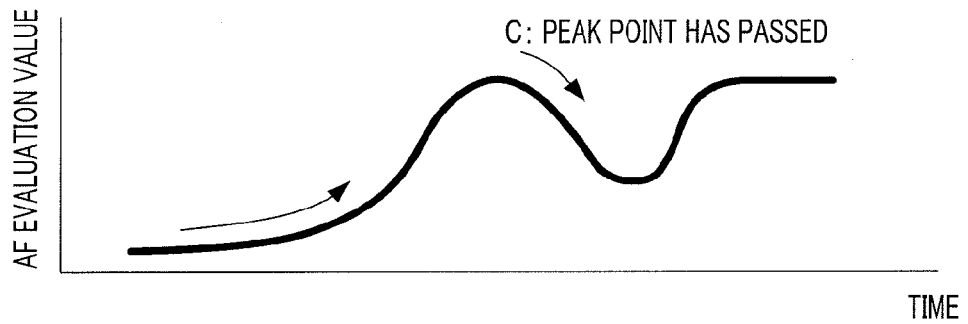
FIG. 10A is a diagram illustrating the movement of a focus lens and the AF evaluation value during a hill-climbing driving of the AF operation.
Figure 10B:
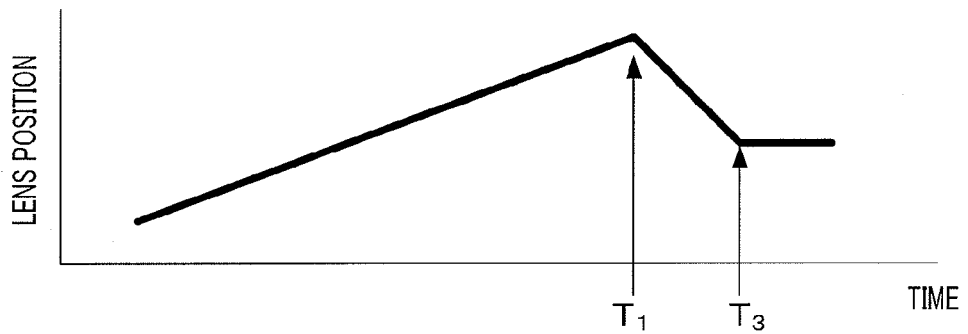
FIG. 10B is a diagram illustrating the movement of a focus lens and the position of the focus lens during a hill-climbing driving of the AF operation.

Next, a description will be given of a hill-climbing driving operation with reference to FIGS. 10A, 10B, and 100. In the hill-climbing driving operation, a focus lens is driven at high speed, the peak position where the AF evaluation value obtained during the movement of the focus lens is maximized or the vicinity thereof is detected. FIG. 10A is a diagram illustrating an exemplary relationship between the movement of a focus lens and the AF evaluation value during the hill-climbing driving operation. FIG. 10B is a diagram illustrating an exemplary relationship between the movement of a focus lens and the position of the focus lens during the hill-climbing driving operation. FIG. 100 is a diagram illustrating an exemplary relationship between the movement of a focus lens and the imaging magnification of a focus lens during the hill-climbing driving operation. The vertical axis in FIG. 10A denotes an AF evaluation value, the vertical axis in FIG. 10B denotes the position of a focus lens, and the vertical axis in FIG. 100 denotes the imaging magnification of a focus lens. The horizontal axis in FIGS. 10A, 10B, and 100 denotes time.

In FIG. 10A, an AF evaluation value increases in association with the movement of a focus lens, and the AF evaluation value is maximized at the point in time "C" and then decreases. Since the presence of the peak position (focused position) can be confirmed at this point, the position of the focus lens is controlled to be returned at the time $T_1$ shown in FIG. 10B. When the focus lens reaches the focused position, where the AF evaluation value is maximized at the time $T_3$, the hill-climbing driving operation is ended and moves to a minute driving operation. On the other hand, when the AF evaluation value has no peak and decreases monotonically, it is determined that a driving direction for the focus lens is incorrect. In this case, the driving direction is reversed and the hill-climbing driving operation continues.

In FIG. 10, a graph curve 1001 indicated by the solid line denotes the changes in the imaging magnification "β" corresponding to the focus lens position. Also, a graph curve 1002 indicated by the dotted line denotes the imaging magnification "βc" for controlling image stabilization computed by the method to be described below with reference to FIGS. 6 to 8, and the details thereof will be described below.

Next, a description will be given of the overall operation of the camera 101 with reference to the flowchart shown in FIG. 6. The processing to be described below is started by turning ON the main power supply of the camera 101. In order to explain the main configuration of the present invention for ease of understanding, various control operations (e.g., battery check, light measurement, lens driving for the AF operation, electronic flash charging, operations for shooting, and the like) performed by the camera 101 will be omitted. Furthermore, the processing shown in the flowchart is ended when the main power supply of the camera 101 is turned OFF regardless of any step performed. In the continuous AF mode in the present embodiment, a continuous focusing operation is repeated with respect to the subject even when a photographer does not push the first switch SW1. When the camera 101 is not in a continuous AF mode, a manual focus mode in which the focus adjustment of the camera 101 is manually performed or a single AF mode that focuses on the subject after the AF scanning operation so as to maintain the focus lens position thereafter may be employed.

Firstly, in step S601, the camera CPU 106 detects the state of a moving image switch (hereinafter referred to as a "moving-image SW"). The moving-image SW is an operation instruction unit that is provided at an operation unit (not shown) and is employed when a photographer captures moving images. When the moving-image SW is in the ON state, the process advances to step S602, whereas when the moving-image SW is in the OFF state, the process advances to step S606. In step S602, the recording of moving images starts. In step S603, the camera CPU 106 performs a continuous AF processing. In step S604, the camera CPU 106 detects the state of the moving-image SW. When the moving-image SW is in the ON state, the process returns to step S603, whereas when the moving-image SW is in the OFF state, the process advances to step S605. In step S605, the recording of moving images ends, and the process returns to step S601.

On the other hand, in step S606, the camera CPU 106 determines whether or not the current mode of the camera 101 is the continuous AF mode. If the current mode is the continuous AF mode, the process advances to step S607. The camera CPU 106 performs continuous AF processing, and then the process advances to step S608.

If the current mode is not the continuous AF mode in step S606, the process advances to step S608. In step S608, the camera CPU 106 determines the state of the first switch SW1. If the first switch SW1 is in the ON state, the process advances to step S609. If the first switch SW1 is in the OFF state, the process returns to step S601. In step S609, the camera CPU 106 performs AE processing based on image data. With this arrangement, the aperture amount and the value of the shutter speed are determined as appropriate. Next, in step S610, the camera CPU 106 performs AF processing. Note that if the manual focus mode is set, the camera CPU 106 does not perform AF processing. In step S611, the camera CPU 106 determines the state of a second switch SW2. If the second switch SW2 is in the ON state, the process advances to step S613. If the second switch SW2 is in the OFF state, the process advances to step S612. In step S613, the camera CPU 106 controls an imaging operation, and the process returns to step S601. In step S612, the camera CPU 106 determines the state of the first switch SW1. If the first switch SW1 is in the OFF state, the process returns to step S601. If the first switch SW1 is in the ON state, the process returns to step S611. The focus position is locked in place until the SW2 is in the ON state or the SW1 is in the OFF state.

Next, a description will be given of an overall operation for controlling image stabilization according to the present embodiment with reference to the flowchart shown in FIG. 7. The processing is started by turning ON the main power supply of the camera 101, and is executed for a predetermined sampling period (interval).

Firstly, in step S701, the camera CPU 106 detects the state of an image stabilization switch (hereinafter referred to as an "image stabilization SW"). The image stabilization SW is an operation instruction unit that is provided at an operation unit (not shown) and is employed when a photographer instructs the camera 101 whether to perform shake correction (the image stabilization SW is in the ON state) or not to perform shake correction (the image stabilization SW is in the OFF state). If the image stabilization SW is in the ON state, the process advances to step S702. If the image stabilization SW is in the OFF state, the process advances to step S718.

In step S702, the camera CPU 106 captures an acceleration detection signal from the accelerometer 109$p$, and captures an angular velocity detection signal from the angular velocity sensor 108$p$. Next, in step S703, the camera CPU 106 determines whether or not shake correction can be performed. For example, it is determined that shake correction cannot be performed in step S703 from the point in time when the power supply is turned ON to the point in time at which the outputs of the accelerometer 109$p$ and the angular velocity sensor 108$p$ are stabilized. Also, it is determined that shake correction can be performed in step S703 after the outputs of the accelerometer 109$p$ and the angular velocity sensor 108$p$ have been stabilized. When the detected value is unstable immediately after turning ON a power supply, the image stabilization performance is insufficient. The determination processing in step S703 is provided so as not to perform shake correction in this state. Note that whether or not an acceleration detection signal or an angular velocity detection signal is stabilized may be determined by the time elapsed from turning ON a power supply, the detected signal varying amount, or the like. When it is determined that shake correction can be performed, the process advances to step S704, whereas when it is determined that shake correction cannot be performed, the process advances to step S718.

In step S704, the camera CPU 106 calculates an angle using the method described with reference to FIG. 3. The angle is the output value of the HPF integration filter 301 shown in FIG. 3. Next, the camera CPU 106 computes a rotation radius L2 for still images in step S705 and computes a rotation radius L1 for moving images in step S706. The comparison unit 308 in the camera CPU 106 performs computation, and the upper limit value described in FIG. 5 may be employed. For example, the still image limit processing unit 502 performs computation processing using the upper limit value set for taking still images. When the rotation radius L2 for still images is equal to or greater than an upper limit value for taking still images, the still image limit processing unit 502 sets L2 as the upper limit value. When the rotation radius L2 for still images is less than an upper limit value for taking still images, L2 is output as it is. On the other hand, the moving image limit processing unit 504 performs computation processing using an upper limit value for shooting moving images. When the rotation radius L1 for moving images is equal to or greater than an upper limit value for shooting moving images, L1 is set as the upper limit value, whereas when the rotation radius L1 for moving images is less than an upper limit value for shooting moving images, L1 is output as it is. The computation results are obtained as the output values of the correction signal rectification units 503 and 505 shown in FIG. 5.

Next, in step S707, the camera CPU 106 determines the state of the second switch SW2. If the second switch SW2 is in the ON state, the process advances to step S708. If the second switch SW2 is in the OFF state, the process advances to step S709.

In steps S708 and S709, the camera CPU 106 calculates an angular rotational shake correction amount which is determined by the equation of the first term of the right side of Formula (5). An angular rotational shake correction amount obtained when the imaging magnification "β" is set to an imaging magnification "βc1" for shooting moving images in step S709 is referred to as an "angular rotational shake correction amount 1", and an angular rotational shake correction amount obtained when the imaging magnification "β" is set to an imaging magnification "βc2" for taking still images in step S708 is referred to as an "angular rotational shake correction amount 2".

[Formula 5]

$$\text{Angular shake correction amount } 1 = (1+\beta c1) \times f \times \theta \quad (7)$$

$$\text{Angular shake correction amount } 2 = (1+\beta c2) \times f \times \theta \quad (8)$$

Note that a method for calculating the imaging magnification "βc" (βc1, βc2) for use in the image stabilization control will be described below.

After performing step S708, the process advances to step S710, and the camera CPU 106 calculates a translational shake correction amount for taking still images using the rotation radius L2 for taking still images calculated in step S705 and the equation of the second term of the right side of Formula (5).

[Formula 6]

$$\text{Parallel Shake Correction Amount for Taking Still Images} = p \times L2 \times \theta \quad (9)$$

The imaging magnification "β" employed herein is set to the imaging magnification "βc2" for taking still images as in step S708. Then, the process advances to step S716.

After performing step S709, the process advances to step S711, the camera CPU 106 determines whether or not the AF mode is a continuous AF mode. If the AF mode is the continuous AF mode, the process advances to step S712. If the AF mode is not the continuous AF mode, the process advances to step S713. In step S712, the camera CPU 106 calculates a translational shake correction amount for shooting moving images using the rotation radius L1 for shooting moving images calculated in step S706 and the equation of the second term of the right side of Formula (5).

[Formula 7]

$$\text{Parallel shake correction amount for shooting still images} = \beta \times L1 \times \theta \quad (10)$$

The imaging magnification "β" employed herein is set to the imaging magnification "βc1" for shooting moving images as in step S709. Then, the process advances to step S716.

In step S713, the camera CPU 106 determines the state of the first switch SW1. If the first switch SW1 is in the ON state, the process advances to step S714. If the first switch SW1 is in the OFF state, the process advances to step S715. In step S714, a translational shake correction amount for shooting moving images is computed as in step S712, and the process advances to step S716. On the other hand, in step S715, the camera CPU 106 sets the translational shake correction amount to zero. In this case, since the AF mode is set to the single AF mode, it is highly probable that the subject is not in focus until an AF operation is performed upon depressing the SW1. Thus, a translational shake correction amount is set to zero. Then, the process advances to step S716.

In step S716, the shake correction amounts are produced, and the camera CPU 106 adds the angular rotational shake correction amount to the translational shake correction amount, which have been calculated, to thereby calculate an image shake correction amount. In step S717, the camera CPU 106 performs driving control of a correction lens in accordance with the produced image shake correction amount. Specifically, the driving unit 112 drives the shake correction unit 110 based on the image shake correction amount, and then the correction lens is driven.

When the process advances from step S701 and step S703 to step S718, the camera CPU 106 stops driving the correction lens. After step S717 and step S718, the shake correction routine is ended. Then, the camera CPU 106 is in a stand-by mode until the next sampling time point is reached, and the shake correction routine starts again.

Next, a description will be given of a method for computing the "angular rotational shake correction amount 2" in step S708, and the "angular rotational shake correction amount 1" in step S709, and setting the imaging magnification "βc" for controlling image stabilization for use in the computation in step S710, step S712, and step S714.

Figure 8:
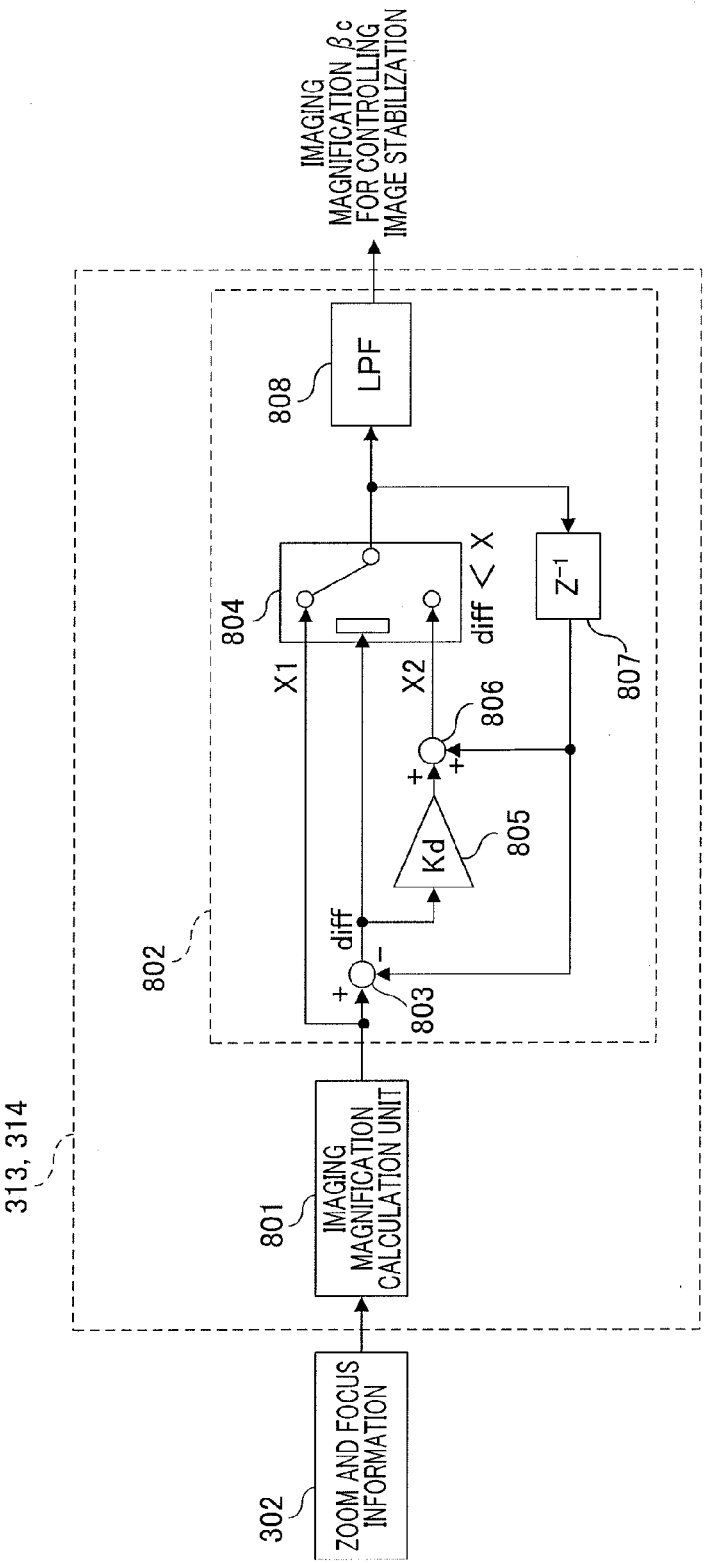
FIG. 8 is a block diagram illustrating calculation processing of an imaging magnification for controlling image stabilization.

FIG. 8 shows an example of processing performed by the angular rotational shake correction coefficient calculation unit 313 and the translational shake correction coefficient calculation unit 314. Here, the translational shake correction coefficient calculation unit 314 outputs the imaging magnification "βc" for controlling image stabilization, and the angular rotational shake correction coefficient calculation unit 313 adds 1 to the imaging magnification "βc" for controlling image stabilization and then multiplies the result by the focal distance "f" determined by the zoom and focus information 302 to thereby output the value of $((1+\beta c) \times f)$.

Hereinafter, a description will be given of a method for computing the imaging magnification "βc" for controlling image stabilization.

The zoom and focus information 302 includes information about the zoom lens position and the focus lens position, and is input to an imaging magnification calculation unit 801. The imaging magnification calculation unit 801 calculates the imaging magnification "β", and sends it to an imaging magnification computation unit 802 for control. The computation unit calculates the imaging magnification "βc" for use in controlling image stabilization.

The output value of the imaging magnification calculation unit 801 is sent as X1 to a condition comparator 804, and is also sent as a positive input to a subtractor 803. The output value of the condition comparator 804 is supplied to the negative input of the subtractor 803 via a delayer 807. The output of the delayer 807 is sampling data one period prior to the output of the condition comparator 804, and the subtractor 803 subtracts sampling data one period prior from the output value of the imaging magnification calculation unit 801. The output of the subtractor 803 is denoted as "diff", this is input to the condition comparator 804. The condition comparator 804 determines whether or not diff is less than a predetermined value (denoted as "X"). When diff is less than the predetermined value X, the condition comparator 804 selects an imaging magnification X1, which is the output value of the imaging magnification calculation unit 801, and outputs it to an LPF (low pass filter) 808.

Diff output by the subtractor 803 is sent to a multiplier 805, and is multiplied by a preset gain (denoted as "Kd"). Here, when the value of the gain Kd is set to a value less than one (e.g., 0.1), diff is a positive numeral and a large value, and the imaging magnification is set so as not to undergo a sudden change. An adder 806 adds the output of the multiplier 805 to sampling data prior to one period through the delayer 807, and sends the addition result as X2 to the condition comparator 804. When diff is equal to or greater than the predetermined value X, the condition comparator 804 selects X2 and outputs it to the LPF 808.

The predetermined value X, which is a determination criteria, is set to a positive value. Hence, if diff is a negative value, X1, which is the output value of the imaging magnification calculation unit 801, is always selected by the condition comparator 804. Therefore, the output value of the condition comparator 804 transitions without delay in a decreasing direction. However, when diff is a positive value and has a large change amount in an increasing direction, a sudden change in imaging magnification for controlling image stabilization is suppressed.

The LPF 808 receives the output value of the condition comparator 804, filters out a high-frequency component from the output, and outputs the imaging magnification "βc" for controlling image stabilization to the sensitivity adjustment unit 303 or the output correction unit 311. The LPF 808 also provides an effect for suppressing a sudden change in imaging magnification for controlling image stabilization.

Figure 10C:
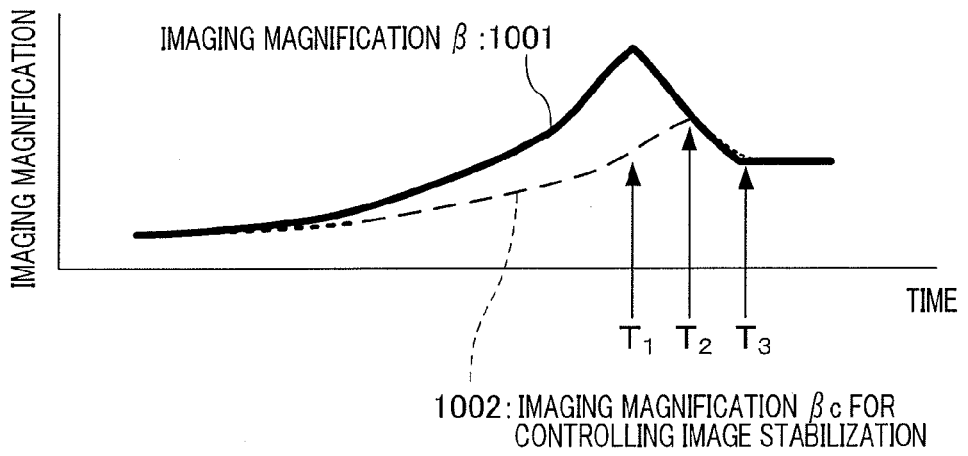
FIG. 10C is a diagram illustrating the movement and the imaging magnification of a focus lens during a hill-climbing driving of the AF operation.

A change in imaging magnification "βc" for controlling image stabilization under the control shown in FIG. 8 will be described with reference to FIG. 9B and FIG. 10C. Time is plotted on the horizontal axis, and the imaging magnification is plotted on the vertical axis. FIG. 9B is a diagram illustrating an example of the changes in the imaging magnification "β" and the imaging magnification "βc" for controlling image stabilization during a minute driving operation. FIG. 100 is a diagram illustrating an example of the changes in the imaging magnification "β" and the imaging magnification "βc" for controlling image stabilization during a hill-climbing driving operation.

In the control operation described in FIG. 8, instead of using the imaging magnification "β" (see the graph curve 901 indicated by the solid line) corresponding to the focus lens position as it is for controlling image stabilization, the imaging magnification "βc" for controlling image stabilization (see the graph curve 902 indicated by the dotted line) is used. The imaging magnification "βc" for controlling image stabilization is the imaging magnification output by the imaging magnification computation unit 802 for control. In a focus driving direction of increasing imaging magnification, βc changes so as to gradually approach the imaging magnification "β" (see the graph curve 901) in order to prevent the image stabilization control from deteriorating. Also, in a focus driving direction of decreasing imaging magnification, the imaging magnification "βc" for controlling image stabilization changes so as to immediately approach the imaging magnification "β" (see the graph curve 901) in order to prevent the image stabilization control from deteriorating. Therefore, the effect of the image stabilization control in association with a sudden change in the direction of increasing the imaging magnification "β" can be reduced.

In FIG. 100, the graph curve 1001 indicated by the solid line denotes the change in imaging magnification "β" corresponding to the focus lens position. The graph curve 1002 indicated by the dotted line denotes the change in imaging magnification "βc" for controlling image stabilization, which has been computed by the method described in FIG. 8, and changes so as to gradually approach the imaging magnification "β" (see the graph curve 1001) upon increasing imaging magnification. At the time $T_1$, a focus lens is temporarily driven to the position beyond the peak position (focused position) of the AF evaluation value. At the time $T_3$, the focus lens reaches the peak position (focused position) of the AF evaluation value. Here, the value of the imaging magnification "βc" for controlling image stabilization is less than the value of the imaging magnification "β" until the time reaches the time $T_2$ between the times $T_1$ and $T_3$, and changes to gradually approach the imaging magnification "β". After the time $T_2$, the value of the imaging magnification "β" decreases, and the value of the imaging magnification "βc" for controlling image stabilization changes in substantially the same manner as the imaging magnification "β". Note that the effect of the LPF 808 provides some delay in the adjustment of the imaging magnification "βc" for controlling image stabilization with respect to the imaging magnification "β".

As described above, the imaging magnification computation unit 802 for control suppresses an increase in imaging magnification for controlling image stabilization in the direction of increasing imaging magnification. In the direction of decreasing imaging magnification, a decrease in imaging magnification for controlling image stabilization is not suppressed or the degree of suppression becomes small as compared to the direction of increasing imaging magnification. Thus, for controlling image stabilization during focus driving with an AF operation, the occurrence of overcorrection caused by a sudden change in imaging magnification can be prevented. Consequently, image stabilization control for angular rotational shake as well as translational shake can be performed even during an AF operation such as moving image photographing or the like.

According to the first embodiment, the correction of translational shake may be performed with high accuracy while reducing the degradation of the image stabilization control performance in association with a sudden change in image magnification during imaging.

Second Embodiment

Next, a description will be given of a second embodiment of the present invention. The basic configuration of the image capturing apparatus according to a second embodiment is the same as that in the first embodiment, and only the differences therebetween will be described below. Components corresponding to or similar to those in the first embodiment are designated by the same reference numerals, and thus, their explanation will be omitted.

Figure 11:
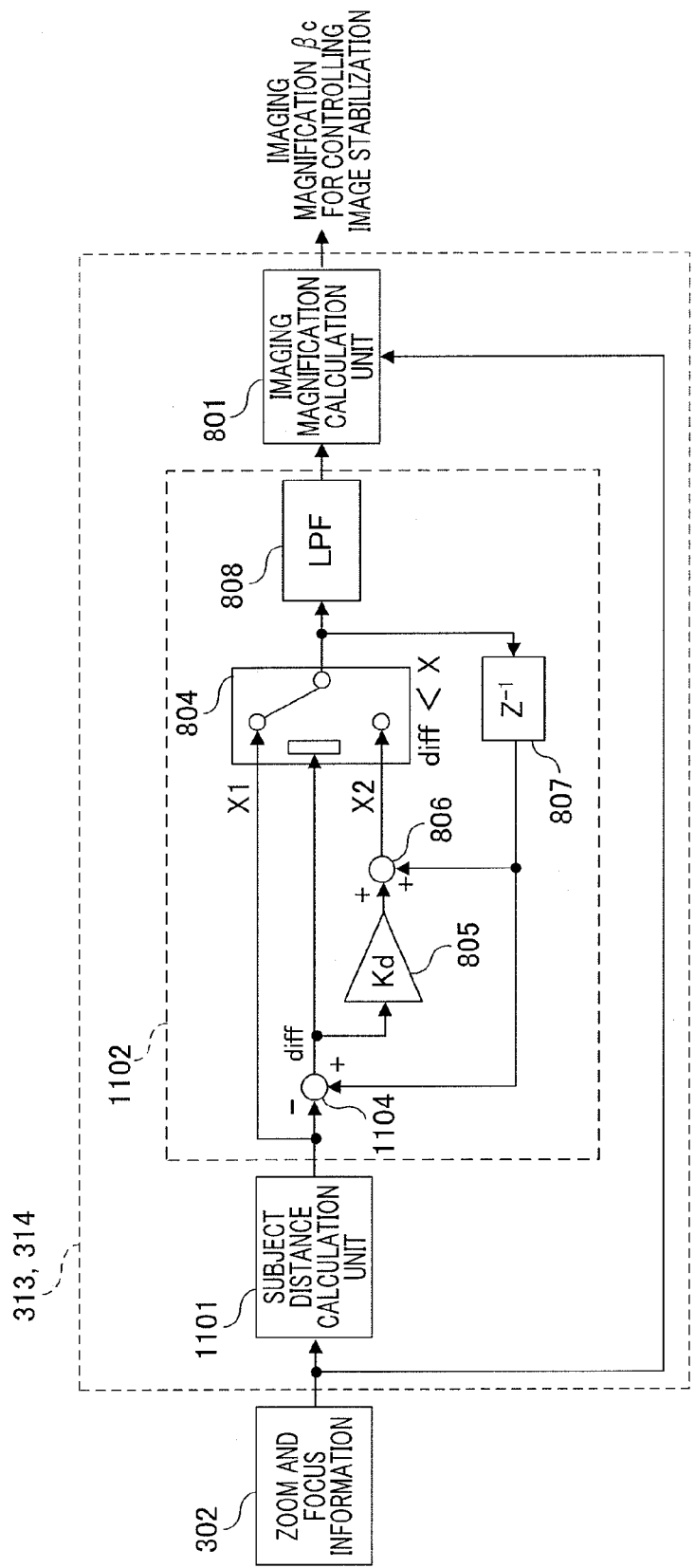
FIG. 11 is a diagram illustrating calculation processing of an imaging magnification for controlling image stabilization in order to describe a second embodiment of the present invention in conjunction with FIG. 11.

FIG. 11 is a block diagram illustrating an example of the calculation processing of an imaging magnification for controlling image stabilization performed by the angular rotational shake correction coefficient calculation unit 313 and the translational shake correction coefficient calculation unit 314 according to the second embodiment.

A subject distance calculation unit 1101 is provided between the zoom and focus information 302 and a subject distance computation unit 1102 for control, and the imaging magnification calculation unit 801 is provided downstream the bank of the subject distance computation unit 1102 for control. The imaging magnification calculation unit 801 outputs the imaging magnification for controlling image stabilization.

The subject distance calculation unit 1101 calculates the subject distance, that is, the distance (subject distance) from the camera 101 to a subject using the zoom and focus information 302. The calculated distance information is sent to the subject distance computation unit 1102 for control that calculates the subject distance for use in controlling image stabilization. The internal configuration of the subject distance computation unit 1102 for control is the same as that of the imaging magnification computation unit 802 for control shown in FIG. 8 described in the first embodiment except that the positive/negative inputs are reversed between a subtracter 1104 and the subtractor 803 shown in FIG. 8. In other words, the output value of the subject distance calculation unit 1101 is the negative input of the subtracter 1104, and the output value of the delayer 807 is the positive input of the subtracter 1104. This is because the subject distance for control needs to be calculated such that a sudden change in imaging magnification in a direction of decreasing subject distance is suppressed and a change in imaging magnification in a direction of increasing subject distance is not suppressed. The subject distance for controlling image stabilization, which has been output by the subject distance computation unit 1102 for control is input to the imaging magnification calculation unit 801. The imaging magnification calculation unit 801 calculates the imaging magnification "βc" for controlling image stabilization using the subject distance and zoom positional information.

Figure 12:
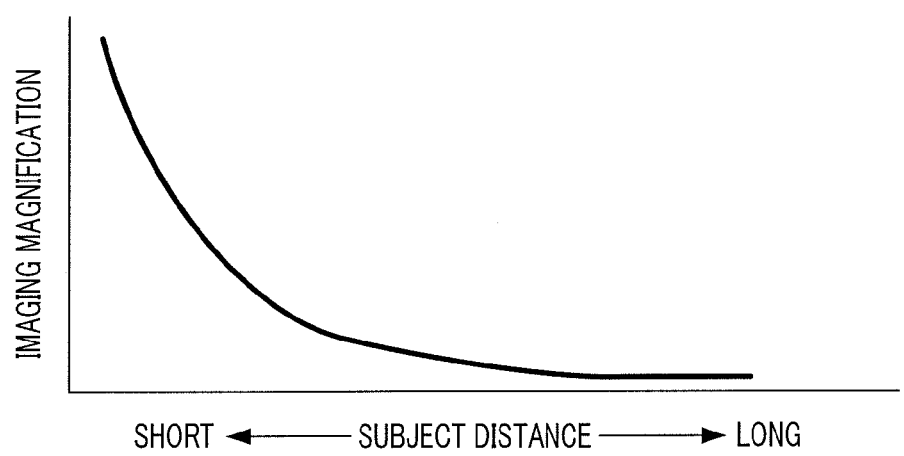
FIG. 12 is a diagram illustrating the relationship between the subject distance from a camera to a subject and the imaging magnification when the zoom position is fixed.

FIG. 12 shows the variation in imaging magnification with respect to the subject distance when the zoom position is fixed. The subject distance is plotted on the horizontal axis and the imaging magnification is plotted on the vertical axis. As the distance from the camera to the subject becomes shorter, the imaging magnification gradually increases.

According to the second embodiment, a sudden change in imaging magnification for controlling image stabilization is suppressed in the direction of decreasing subject distance (the direction of increasing imaging magnification). Also, in the direction of increasing subject distance (the direction of decreasing imaging magnification), a change in imaging magnification for controlling image stabilization is not suppressed or the degree of suppression becomes small as compared to the direction of decreasing subject distance. Thus, for controlling image stabilization during focus driving with an AF operation, the overcorrection of image stabilization caused by a sudden change in imaging magnification can be prevented. Consequently, image stabilization control for angular rotational shake as well as translational shake can be performed even during an AF operation such as moving image photographing or the like. As compared to the computation of the imaging magnification "βc" for controlling image stabilization according to the first embodiment, the effect of suppressing a sudden change in imaging magnification may be obtained.

The image stabilization control apparatus of the present invention can be mounted in a digital single-lens reflex camera or a digital compact camera. The present invention is not limited to thereto. The image stabilization control apparatus can also be mounted in various optical apparatuses such as a digital video camera, a monitoring camera, a Web camera, or a mobile phone.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-234207 filed Oct. 19, 2010 which is hereby incorporated by reference herein in its entirety.

What is claimed is:

1. An optical apparatus having an imaging optical system, the optical apparatus comprising:
    a first detection unit configured to detect angular rotational shake;
    a second detection unit configured to detect translational shake in such a way that is distinct from the first detection unit;
    a control unit configured to compute an image shake correction amount by producing a correction amount for the angular rotational shake and a correction amount for the translational shake based on the output of the first detection unit and the output of the second detection unit;
    a driving unit configured to drive a shake correction unit in accordance with the image shake correction amount; and
    a distance calculation unit configured to calculate a distance to a subject using positional information about a zoom lens and a focus lens of the optical system,
    wherein the degree of the suppression of the change of the distance to the subject using for computing the image shake correction amount in the direction of decreasing the distance to the subject is larger than the degree of the suppression of the change of the distance to the subject using for computing the image shake correction amount in the direction of increasing the distance to the subject.

2. The apparatus according to claim 1,
    wherein the control unit calculates an image magnification for controlling image stabilization using positional information about the zoom lens and the focus lens of the optical system, and computes the image shake correction amount based on the image magnification.

3. The apparatus according to claim 2,
    wherein the control unit suppresses the change of the distance and calculates the image magnification when the zoom lens and the focus lens are driven in the direction of decreasing the distance to the subject, calculates the image magnification without suppressing the change of the distance when the zoom lens and the focus lens are driven in the direction of increasing the distance to the subject, and calculates a correction amount for the angular rotational shake and a correction amount for the translational shake using the calculated image magnification.

4. A method for controlling an optical apparatus, the method comprising:
    detecting, in a first detection step, angular rotational shake;
    detecting, in a second detection step, translational shake in such a way that is distinct from the first detection step;
    computing, in a control step, an image shake correction amount by producing a correction amount for the angular rotational shake and a correction amount for the translational shake based on the output of the first detection step and the output of the second detection step;
    driving, in a driving step, a shake correction unit in accordance with the image shake correction amount; and
    calculating, in a distance calculation step, a distance to a subject using positional information about a zoom lens and a focus lens of the optical system,
    wherein the degree of the suppression of the change of the distance to the subject using for computing the image shake correction amount in the direction of decreasing the distance to the subject is larger than the degree of the suppression of the change of the distance to the subject using for computing the image shake correction amount in the direction of increasing the distance to the subject.

* * * * *